United States Patent

Bower

[15] 3,702,637

[45] Nov. 14, 1972

[54] CONTROL VALVE AND DISCHARGE HOSE FOR PRESSURIZED FIRE EXTINGUISHERS

[72] Inventor: James C. Bower, 20113 Lorain Avenue, Fairview, Ohio 44070

[22] Filed: Feb. 12, 1971

[21] Appl. No.: 114,936

[52] U.S. Cl. ............ 169/31 R, 200/61.08, 292/307 R
[51] Int. Cl. ............................................. A62c 13/00
[58] Field of Search .......... 169/31 R, 31 P; 222/153, 222/402.11, 402.15, 474; 137/68, 383, 384; 200/61.08, 61.85; 102/64, 65; 292/307 R, 316

[56] References Cited

UNITED STATES PATENTS

| | | |
|---|---|---|
| 3,105,458 | 10/1963 | Downham ................ 169/31 P |
| 3,666,016 | 5/1972 | Estes ....................... 169/31 R |
| 3,370,826 | 2/1968 | Rodgers ................... 169/31 R |
| 3,188,417 | 6/1965 | Rasmusson et al. .... 200/61.08 |
| 3,092,183 | 6/1963 | Guise et al. .............. 169/31 R |
| 3,589,446 | 6/1971 | Bower ...................... 169/31 P |
| 2,726,381 | 12/1955 | Verkuil ............ 200/61.08 UX |
| 3,031,165 | 4/1962 | Allen ................... 169/31 R X |

*Primary Examiner*—M. Henson Wood, Jr.
*Assistant Examiner*—Michael Y. Mar
*Attorney*—John Harrow Leonard

[57] ABSTRACT

A manually operable control valve, which discharges through a flexible hose, has a movable operating handle and a stationary hand grip which can be grasped in the hand of an operator and squeezed toward each other for opening the valve. A shear pin interlocks the handle and valve and is such that it can be readily sheared by squeezing the handle toward the hand grip under weak to moderate hand pressure. The shearing strength of the pin is specifically related to the physical strength of the operating handle so that the pin will shear under forces applied to the handle in the valve opening direction of insufficient intensity to damage the handle. An externally visible tell-tale fastener holds the pin in place but can readily be broken free from the pin by pulling the pin endwise.

The handle, pin, and fastener are of material such as to eliminate galvanic corrosion at their juxtaposed surfaces. The hose is held by a portion of the shear pin in a non-operative position, and that portion is cut free upon shearing the pin by operating the handle.

13 Claims, 9 Drawing Figures

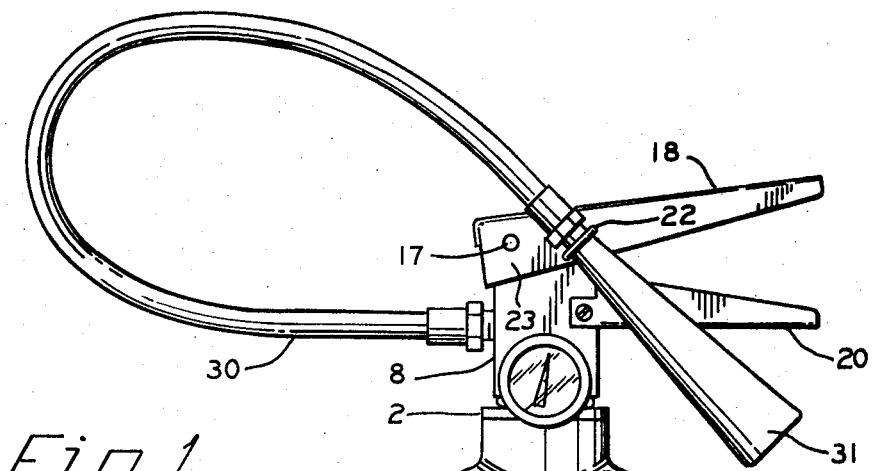
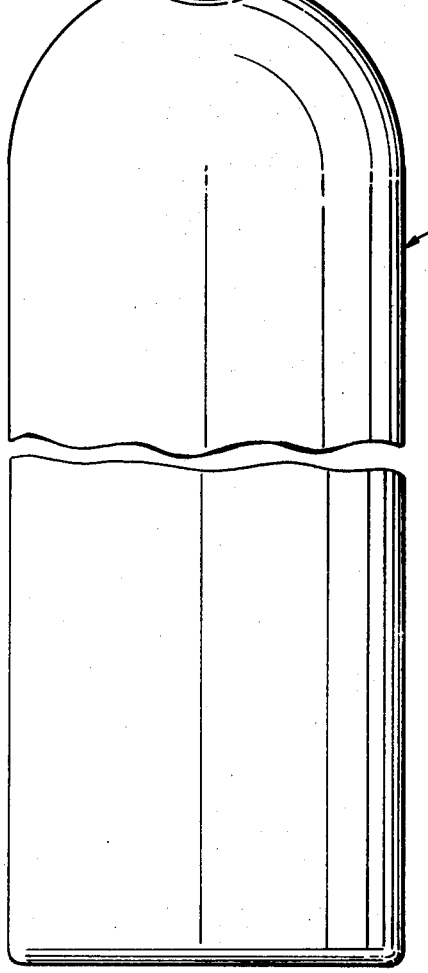
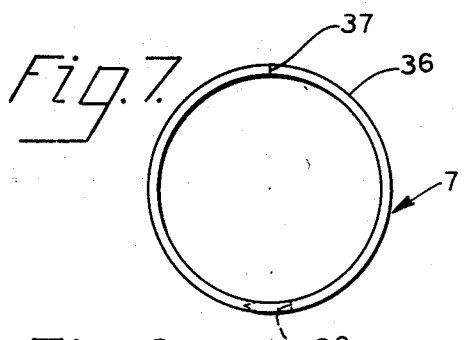
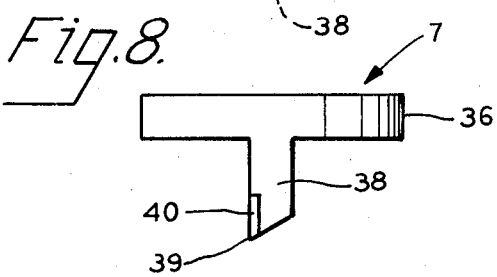
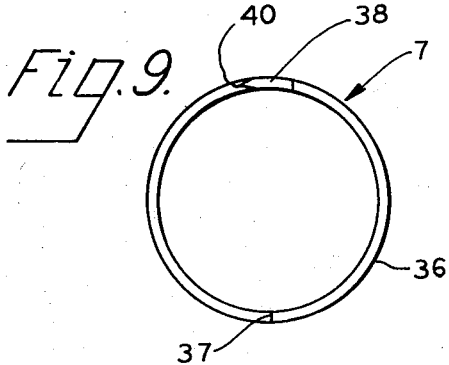

INVENTOR.
James C. Bower,
BY
John H. Howard,
his ATTORNEY.

3,702,637

CONTROL VALVE AND DISCHARGE HOSE FOR PRESSURIZED FIRE EXTINGUISHERS

BACKGROUND

1. Field of Invention

This invention relates specifically to a fixture for high pressure fire extinguishers of the general type employing a high pressure tank and a manually operable control valve screw fitted to the top of the tank and discharging through a flexible hose which is connected at one end to the valve and which has a dispensing nozzle at the other end.

2. Description of Prior Art

Heretofore, highly pressurized fire extingishers have been provided with dispensing valve fixtures employing a stationary hand grip and a movable operating handle, both of which can be gripped concurrently in the hand of an operator and squeezed toward each other for opening the valve. Frequently, with such valves, the handle is latched and constrained from operation by a pin which must be removed before the handle can be operated. The pin is held in place by a suitable externally visible fastener which engages an end of the pin and which must be removed before the pin can be pulled out of latching position. A number of disadvantages result from this type of structure.

First, under the stress of an emergency, the operator is apt to grab the handle and hand grip and squeeze them toward each other to open the valve, only to find that the handle is locked by the pin. Then he will try using both hands or otherwise exert pressure sufficient to damage the handle, such as by bending it against the hand grip so that it cannot be moved in the valve opening direction, or by breaking it off, or by damaging the valve mechanism so that the valve cannot function normally.

Quite often, a difference in the metals of the valve, the pin, and the fastener are such that galvanic currents are set up at the juxtaposed surfaces which result in corrosion of the handle, valve body, pin, and fastener and binding of these parts together or binding of the fastener on the pin so that the fastener cannot be removed from the pin.

Furthermore, if the fire extinguisher is dropped from the normal carrying height and lands valve end foremost on the manual operating handle, the resultant force is often such as to bend or break the handle or otherwise render the valve inoperable. In the present invention these disadvantages are overcome.

SUMMARY OF THE INVENTION

The present invention relates to certain improvements in fixtures of this type directed primarily to safety. The improvements assure proper operation of the extinguisher in normal use, reduction of possibility of damage or jamming of the fixture and valve mechanism when operated accidentally or by undue exertions of an operator who is under stress, and protection of the valve from damage when the tank and assembled valve fixture are accidentally dropped from a substantial height valve fixture foremost.

The handle is fastened in inoperative position by a shear pin, portions of which are visible at the outside of the valve and the absence of which portions indicates that the extinguisher has been used or tampered with or the pin sheared. The pin can be sheared off by forces too weak to damage the valve or to impose appreciable resistance to normal operation.

The materials are selected so as to eliminate galvanic corrosion. The hose is released by shearing of the shear pin.

Various other specific objects and advantages will become apparent from the following description wherein reference is made to the drawings.

DESCRIPTION OF DRAWINGS

FIG. 1 is a perspective view of a fire extinguisher and valve fixture combination embodying the present invention;

FIG. 7 is an enlarged top plan view of a cutter which may be used in the combination of FIG. 1;

FIG. 8 is a front elevation of the cutter illustrated in FIG. 7; and

FIG. 9 is a bottom plan view of the cutter.

DESCRIPTION OF PREFERRED EMBODIMENT

Figure 2:
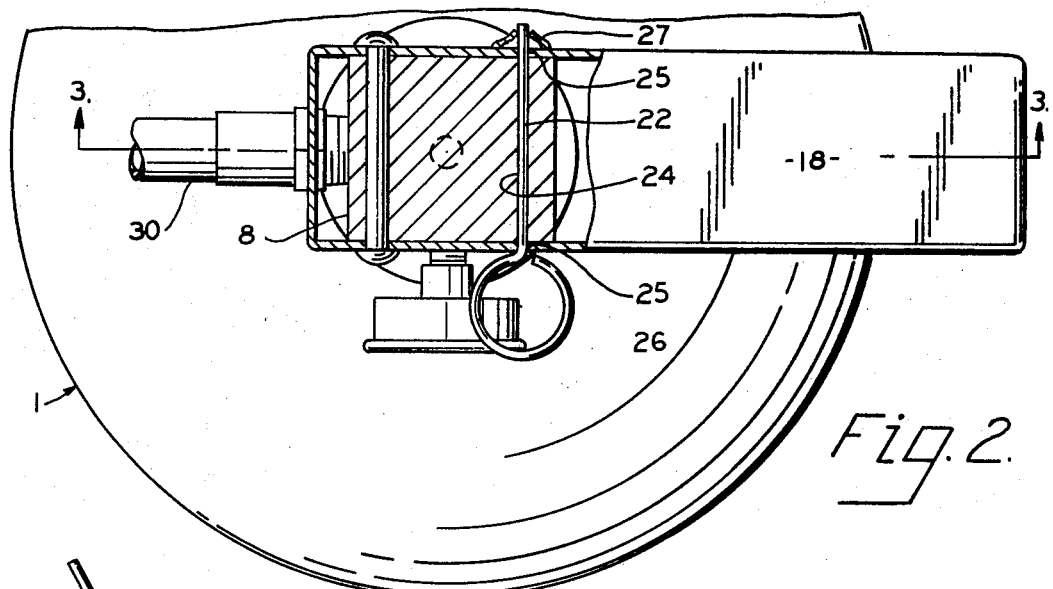
FIG. 2 is an enlarged top plan view of the fire extinguisher with the valve and discharge hose of the present invention installed thereon, part thereof being shown in section for clearness in illustration.
Figure 3:
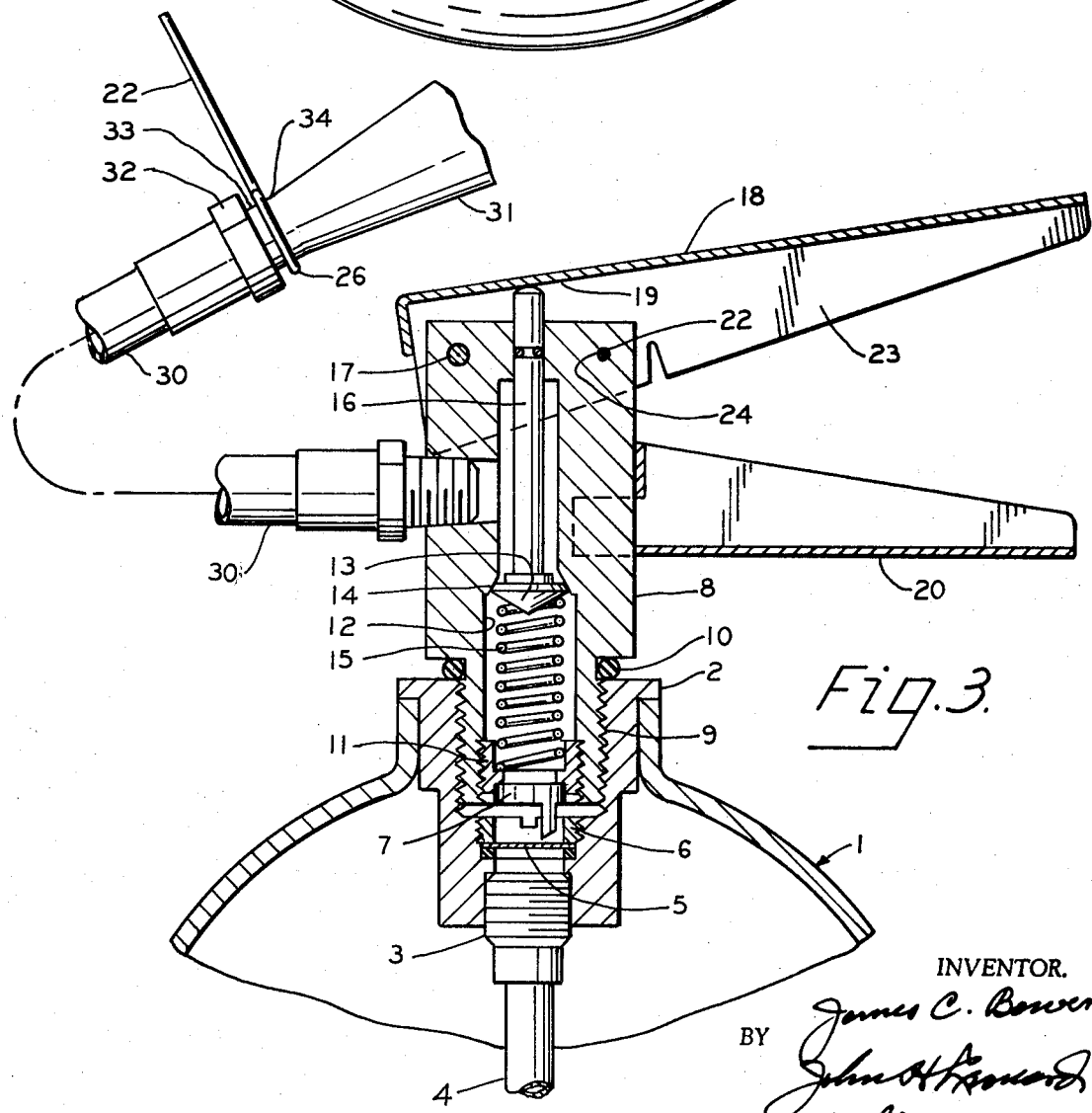
FIG. 3 is a fragmentary vertical sectional view of the valve taken on the line 3—3 in FIG. 2.
Figure 4:
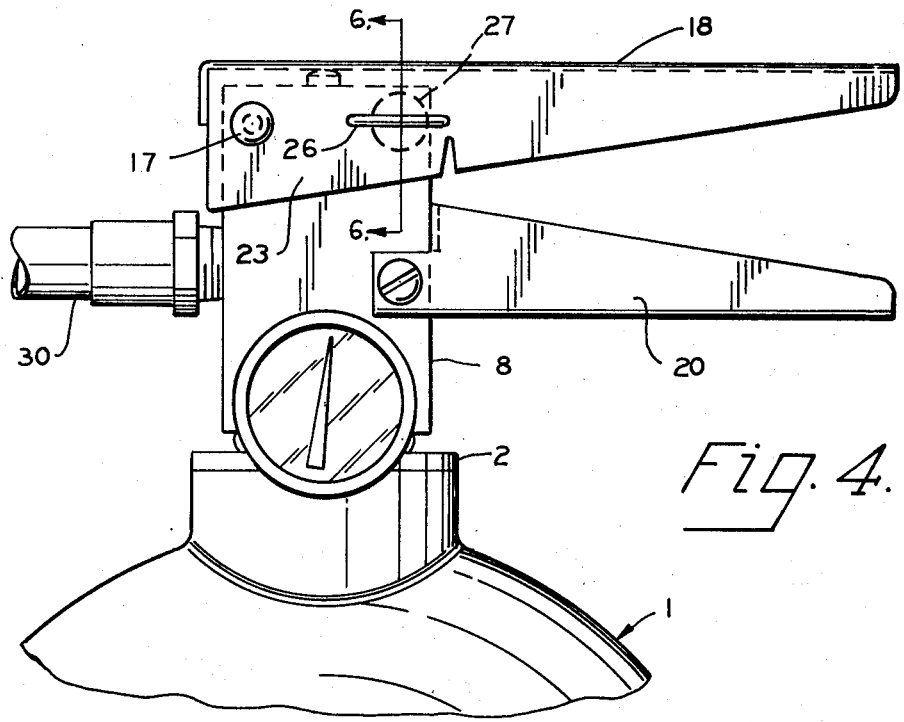
FIG. 4 is a fragmentary front elevation of the valve fixture illustrated in FIG. 1.
Figure 5:
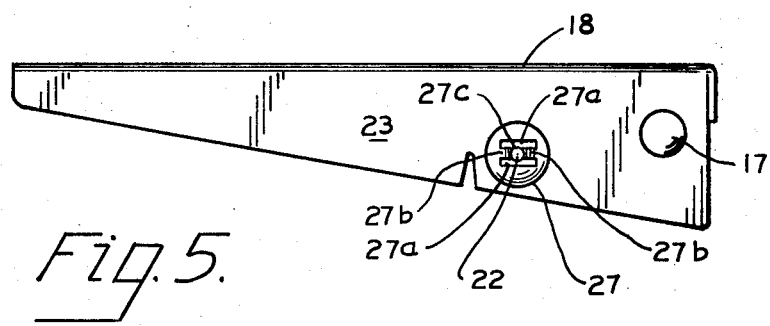
FIG. 5 is a fragmentary rear elevation of the structure illustrated in FIG. 4.
Figure 6:
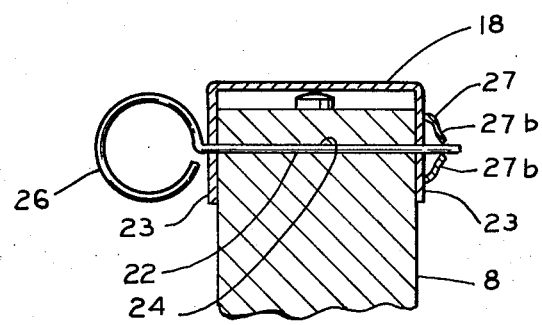
FIG. 6 is a fragmentary vertical sectional view taken on line 6—6 in FIG. 4.

Referring to the drawings, the valve fixture is shown as connected to a pressurized fire extinguisher tank 1 having at its upper end a neck in the lower end of which is mounted an internally threaded sleeve 2. A fitting 3 installed in the neck carries a syphon tube 4.

If it is desired to store the precharged pressurized tanks for future assembly with the fixture, a seal or diaphragm 5, such as described in my U.S. application Ser. No. 847,159, filed Aug. 4, 1969, now U.S. Pat. No. 3,589,446 and entitled Sealing Rupturing and Dispensing Fixture for Normally Sealed Pressurized Tanks, may be provided. If used, the diaphragm 5 may be secured in place by a ring-nut 6, so as to be cut open by a cutter 7, as later to be described, when the valve fixture is installed.

The valve comprises a body 8 having a threaded neck 9 which is threadably connected in the sleeve 2, a suitable annular seal 10 being provided for assuring a tightly sealed joint between the body 8 and sleeve 2. The neck 9 is internally threaded and carries, in fixed axial position therein, an internal sleeve 11 having a passage therethrough leading to an internal passage 12 in the body 8.

A valve 13 of the poppet type is mounted in the body and is urged against a seat 14 in the body by a suitable spring 15 which is interposed between the valve 13 and a shoulder in the sleeve 11. The valve is operated by an axially movable stem 16 having its upper end projecting from the upper end of the body 8.

Pivotally mounted on the body by means of a pivot 17 is an operating handle 18 having an abutment portion 19 which engages the upper end of the stem 16 for moving the valve downwardly to open position against the force of the spring 15. Mounted on the body 8 beneath the handle is a stationary hand grip 20 which is positioned relative to the handle so that the handle and grip can be grasped in the hand of an operator and the handle squeezed toward the grip for opening the valve.

As mentioned, the handle is yieldably held in inoperative position, illustrated in FIG. 2, by means of the spring 15 and is latched in that position by a shear pin 22. For latching the handle, the handle is provided with depending lateral flanges 23 which lie alongside, and in close proximity to, opposite sides of the body 8. The body is provided with a lateral passage 24 parallel to the pivot 17 and the flanges 23 are provided with passages 25 which are alignable concurrently with the ends of the passage 24 while the handle is in normal inoperative position. The shear pin 22 extends from the outer face of one flange 23 through the passage 24 and out beyond the outer face of the opposite flange 23.

The pin has a head 26 at one end and at the other end, which projects beyond the adjacent flange 23 at the opposite side of the handle, receives a tell-tale fastener 27, which frictionally grips the end of the pin and bears against the flange 23 to prevent accidental withdrawal of the pin endwise from the passages 24 and 25 head 26 foremost.

The fastener 27 is in the form of a generally concavo-convex disk having slits 27a formed therein to provide slightly flexible or resilient tongue portions 27b which terminate short of each other diametrically of the disk and provide a central passage 27c of slightly smaller diameter than the pin 22. With the pin extending through the passages 24 and 25 with the head 26 of the pin engaged with one flange 23 of the handle, the fastener 27 can be pressed onto the other end of the pin, concave side foremost, thus stressing the tongues 27b out of normal position in a direction away from the adjacent flange 23 so that they grip the pin firmly for holding it in place in the passages. The pressure of the tongues against the pin increases as the pin is subjected to forces directed to pull it head end foremost out of the passages.

The fastener 27 is made of a readily frangible or breakable material so that the pin can be pulled out of it, or can break it or the tongues loose, by a deliberate substantial pull on the pin endwise.

On the other hand, the pin is of such material that when the handle 18 is moved downwardly toward the grip 20 by weak or moderate hand pressure, the pin shears adjacent the head 26 and adjacent the fastener 27, so that both the head and fastener are freed and drop clear of the portion of the pin in the passage 24, thus freeing the handle and indicating that the pin has been sheared.

On the other hand, if the pin is pulled out of the passage 24 head 26 foremost, the fastener is broken, again indicating that the valve has been tampered with in some manner.

It must be remembered that fire extinguishers of this character may stand for extremely long periods without use and it is necessary to guard against possible sticking and bonding of the parts together by corrosion and against resultant improper operation. For this purpose, the body 8, the handle 18, and the shear pin 22 are made of similar metal so as to eliminate the possibility of galvanic corrosion. The pin must shear, not bend and bind, so plastic pins are undesirable.

Likewise, in order to assure that the pin can be pulled out of locked position, the fastener preferably is made of plastic or of non-metallic substances so that galvanic and other corrosion is eliminated and the fastener is not bound to the pin. As mentioned, it is desirable that the pin shear readily under weak hand pressure so that a person having only a very weak grip, such as, for example, a secretary, can shear the pin and operate the handle merely by grasping the handle 18 and grip 20 and squeezing them together. For this purpose, the pin must be very readily shearable. Preferably it is made of a special aluminum alloy which shears at a pressure of about 52 pounds, plus or minus 5, at the maximum. This shearing strength of the pin is related to the strength of the operating handle 18 so that, should the fire extinguisher with its heavy tank be dropped with the valve fixture and tank inverted so that the handle strikes the floor and takes the full impact, the pin will shear off allowing the handle to operate, instead of holding the handle in locked position against such a force which would be sufficient to bend or damage the locked handle, for example, by breaking the handle, or by bending the outer end of the handle down against the hand grip so it can no longer be operated by squeezing the handle and hand grip together, or by bending or shearing its pivot.

With the pin made of aluminum alloy and the fastener of plastic, galvanic corrosion therebetween at points of contact is practically eliminated. The plastic fastener 27, or its tongues, will break or shear off readily by pulling endwise on the pin head 26 foremost at a modest pressure which can readily be exerted by any operator.

In general, the valve discharges through a flexible hose 30 having at its discharge end a discharge nozzle 31. Generally it is desirable that the fire extinguisher be stored with the hose held in a position such that the nozzle is directed downwardly operated. away from the face of the operator. Yet the hose must be held so that it can be readily removed for fighting a fire. For this purpose, the head 26 of the pin is made in the form of an eyelet of a size to fit the end of a fitting 32 on the hose into which the shank of the nozzle 31 is screwed, the eyelet being disposed between the shoulder 33 on the fitting 32 and an inner end shoulder 34 of the nozzle. Thus, before operating the valve, the nozzle and hose are grasped, and with a light pull endwise the pin 22 is removed from its locked position after which the valve can be operated.;8c On the other hand, should the valve be operated without removing the pin, the shearing off of the pin frees the head 26 and allows it, with the attached nozzle and hose, which is then under high pressure due to opening of the valve, to swing outwardly and straighten out away from the operator.

In same instances, as mentioned, it may be desirable to provide a precharged sealing container in which case it is desirable to have the cutter 7 for puncturing the seal when the valve is installed, as more fully described in my above identified copending application. In such a case the sleeve 11 may be used as a support for the cutter 7.

The cutter 7 is in the form of a split ring 36, having a split 37 therein and an integral blade 38 projecting endwise from its peripheral wall. The metal used is hard steel adequate to cut a kerf the entire thickness of the diaphragm 5 in one revolution.

The blade 38 has a sharp piercing point 39 and a leading cutting edge 40. The split ring is contracted and then inserted in the sleeve 11 and seats on a shoulder 41 therein. When fully expanded, and pressed against the walls of the sleeve 11, it locks the cutter firmly into the sleeve 11. The ring may be braised or welded in place if desired. The blade is so positioned that with the sleeve 11 fully seated in the neck 9, when the neck 9 is screwed into the top of the sleeve 2, the blade 38 will first pierce the seal or diaphragm 5 and then, having pierced it, will cut for the full thickness of the seal from the point of complete piercing, entirely around the diaphragm so as to cut loose a central circular portion or disc.

Due to the pressure within the tank 1, this disc is blown upwardly against the lower end of the spring 15, which since it is spiral in shape, engages only one edge of the disc portion, which thereupon tilts into a position which allows free passage of the powdered or liquid pressurized contents of the tank into the valve. The cutter is mounted in the sleeve 11 so that the distance between the upper end of the tank and the seal 10 on the valve body is greatly reduced.

Having thus described my invention, I claim:

1. A fire extinguisher comprising:
 a tank for holding a charge of pressurized fire extinguishing material;
 a normally closed manually operable discharge valve connected to the tank;
 said valve including two relatively movable metal members which, in the closed condition of the valve, are in a predetermined position relative to each other and which must be moved relatively out of said position to open the valve;
 characterized in that -
 a metal shear pin operatively interconnects and locks the members in said predetermined position, and is shearable by movement of the members out of said predetermined position by a force normally applied manually to one of the members in a direction to move the members out of said predetermined position, which force, at maximum, is small enough so that it can be readily applied by the hand of an operator; and
 said pin has sufficient strength to be sheared clean, free from bending and breaking, and to provide substantial, readily detectable, resistance to said movement by manually applied forces less than said maximum force.

2. The structure according to claim 1 wherein shearing abutment means are carried by the members respectively, the shear pin is insertable between the abutment means and, when so inserted, is supported thereby in position for so locking the members and with at least one portion of the pin disposed exteriorly of the valve and in a position relative to the abutment means and valve so that said portion can be sheared off of the remainder of the pin by the abutment means upon said movement of said members out of said predetermined position and, when so sheared off, can drop free of the valve and out of interfering relation to the operation of any of the valve parts.

3. The structure according to claim 1 wherein the valve includes an operating handle which is movable in one direction to move said members out of said predetermined position so as to open the valve; the relation of the strength of the pin to the strength of the handle is such that the pin is shearable by force applied to the handle in said one direction of movement of the handle, and which would be insufficient to damage the handle were the handle locked fixedly against said movement in said one direction while said force is applied.

4. The structure according to claim 1 wherein said members have passages therethrough which are positioned to receive the pin, one end portion foremost, when the members are in said predetermined position;
 the shear pin lies in said passages and said one end portion projects endwise of the pin beyond the passages and exterior surface of the members; and
 restraining means are provided on said one end portion of the pin and normally constrain the pin from withdrawal, other end foremost, from the passages.

5. The structure according to claim 4 wherein said restraining means is a fastener engaged with said one end portion of the pin and positioned to engage one of the members and prevent said withdrawal of the pin from the passages while the fastener remains intact; and
 said fastener is non-metallic and is readily broken free from said end portion of the pin by forces applied to the pin in a direction to pull the pin other end foremost out of the passages.

6. The structure according to claim 5 wherein the fastener is composed of set synthetic plastic.

7. The structure according to claim 1 wherein the members and pin are metals which resist galvanic corrosion relative to each other when in mutual contact.

8. A fire extinguisher comprising:
 a pressurizable tank;
 a discharge fitting connected to the tank and having a discharge passage;
 an imperforate seal detachably secured to the fitting and closing said passage;
 a manually operable valve having a body detachably connected to the tank and having a discharge passage in communication with the discharge passage of the fitting when the latter passage is open;
 said valve including a plug which is manually operable for opening the valve and a return spring normally sealing the plug, said plug and spring being in said passage with the spring between the plug and the discharge passage of the fitting;
 cutting means connected to the valve body and having a passage therethrough connecting the fitting passage and valve passage;
 said cutting means including a cylindrical sleeve between the spring and discharge passage, and an integral blade extending from the inner end of the sleeve and of hardened cutting material, and protruding endwise from the sleeve toward the seal and supporting the blade for concurrent rotation and advance toward the sleeve;
 said blade being operable by said concurrent rotation and advance to pierce the seal and cut an arcuate kerf therein of at least 360°; and
 said spring being shaped to restrain the cut-loose part of the seal from being driven by the discharge from the tank toward the valve beyond the inner end of the spring and to prevent the cut-loose part from assuming any position in which it could interfere with adequate discharge of the charge from the tank.

9. A fire extinguisher comprising:

a pressurizable tank for holding a pressurized charge of fire extinguishing material;

a normally closed, manually operable, discharge valve connected to the tank;

flexible discharge conduit means connected at one of its ends to the valve and including, at its other end, a discharge nozzle;

said valve including two members which, in the closed position of the valve, are in a predetermined position relative to each other, which are manually movable relative to each other out of said position, and which are operative when so moved to open the valve;

a manually removable restrainer supported by the members and, while so supported, interconnecting said members so as to resist their relative movement out of their said predetermined relative position and so as to be removable from said normal interconnecting relation by bodily movement of the restrainer manually away from the valve for thereby freeing the members for relative movement out of their said predetermined relative position;

characterized in that:

said restrainer has a connecting portion which connects the restrainer to the conduit means in close proximity to the nozzle and which supports the nozzle in a position near the valve and so that the restrainer is removable from its normal interconnecting position by predetermined movement of the nozzle away from the valve.

10. The structure according to claim 9, wherein an easily frangible fastener is connected to the restrainer and is positioned for engagement with one of the members so as to be broken free of the restrainer and said one of the members by, and upon, said bodily removal of the restrainer.

11. The structure according to claim 10, wherein the restrainer and members are of metals which resist galvanic corrosion relative to reach other.

12. The structure according to claim 9, wherein the members have complementary shearing abutments, respectively; the restrainer is a shear pin; said connecting portion extends outwardly from said members exteriorly of the valve so as to be sheared free from the remainder of the pin and freed from the members, upon relative movement of the members out of said predetermined position while the pin is between said abutments, and thereby frees the nozzle for manipulation relative to the valve.

13. The structure according to claim 9, further characterized in that:

said connecting portion supports the conduit means in a position in which the nozzle is directed downwardly and laterally of the valve.

* * * * *